Sept. 14, 1954  C. W. HEIL  2,688,932
CONVEYER APPARATUS AND CONTROL SYSTEM THEREFOR
Original Filed Nov. 13, 1945  3 Sheets-Sheet 3
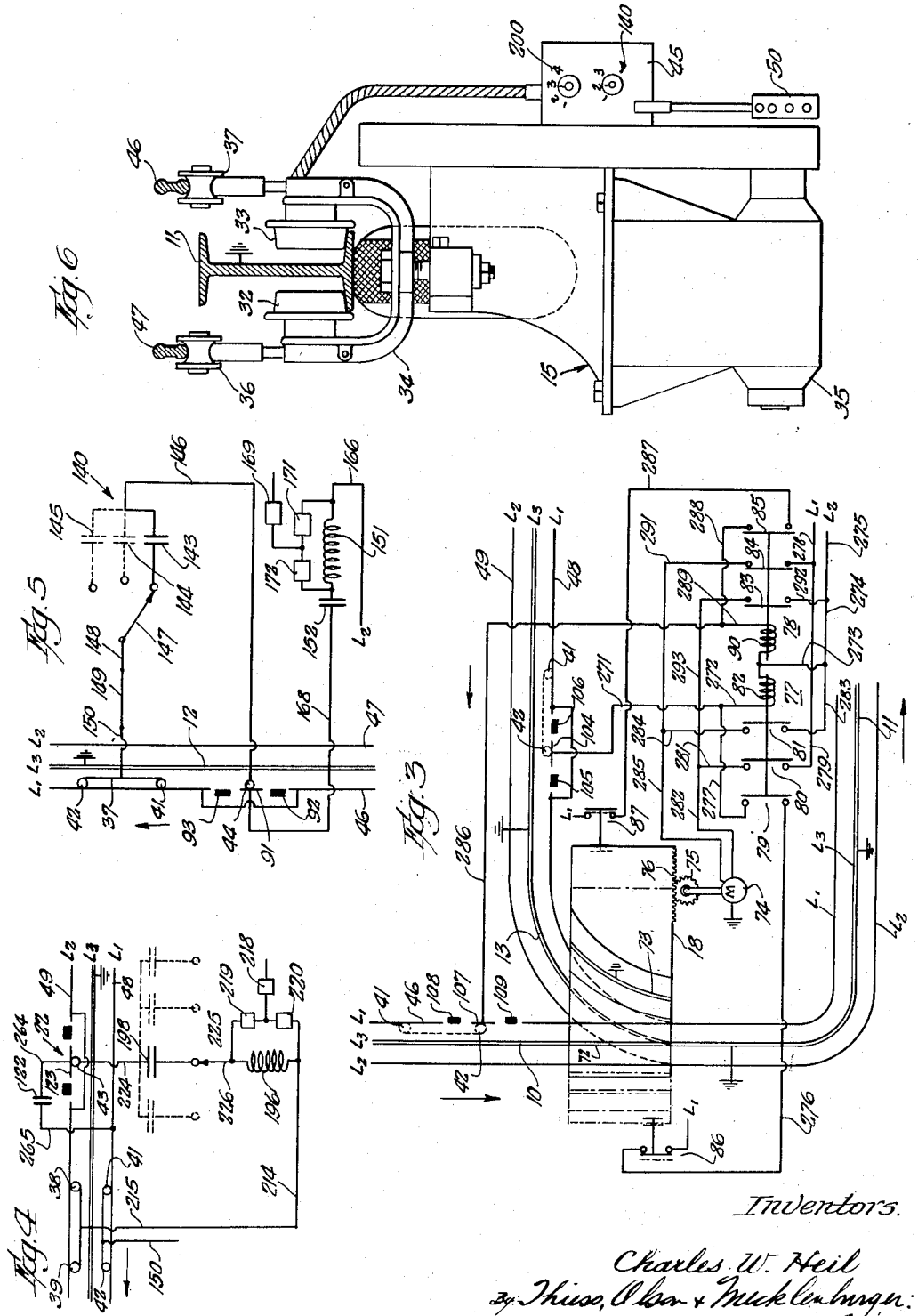
Inventors.
Charles W. Heil
by Thiess, Olson & Mecklenburger
Attys.

Patented Sept. 14, 1954

2,688,932

UNITED STATES PATENT OFFICE 2,688,932

CONVEYER APPARATUS AND CONTROL SYSTEM THEREFOR

Charles W. Heil, Fairfield, Iowa, assignor to The Louden Machinery Company, Fairfield, Iowa, a corporation of Iowa Continuation of abandoned application Serial No. 628,170, November 13, 1945. This application February 2, 1953, Serial No. 334,701

19 Claims. (Cl. 104—88)

1

This invention relates to conveyor systems including trackways or guides and conveyors adapted to move thereon, and control means for controlling the stopping and starting of the conveyors as well as the direction of their movement. More particularly, the invention relates to control systems for conveyors running on trunk and branch trackways having different stopping points, wherein any conveyor embodies means within itself to predetermine its course of travel and its stopping point, so that once a conveyor is started on its way and is beyond the immediate control of the operator, it selects the branch trackway it is to run on and it further selects the stopping point on the branch trackway, both as predetermined by the operator, and it is an object of the invention to provide an improved conveyor control system of the character indicated.

This application is a continuation of co-pending application Serial No. 628,170 filed November 13, 1945, by the same inventor and which application is now abandoned.

It is a further object of the invention to provide an improved control system for conveyors. In the copending application Serial No. 603,158, filed July 4, 1945, now abandoned, entitled Conveyor Apparatus and Control System Therefor, and assigned to the same assignee as the present invention, a conveyor control system embodying generating means carried by conveyors moving on a system of trackways and receiver circuits arranged adjacent track switches for cooperation with the generating means to control operation of the track switches together with generating means disposed at stop stations along the trackways and receiver circuits carried by the conveyors for cooperation with the latter generating means to control stopping of the conveyor is disclosed. Such arrangements are bulky, expensive in construction and difficult of maintenance. Accordingly it is a further object of the invention to provide an improved conveyor control system of the character indicated that is simple in character, inexpensive in construction and efficient in use.

In carrying out the invention in one form, in conveyor apparatus including a trackway, a conveyor adapted to move along the trackway and a source of electrical energy, the combination comprising one circuit component connected to the source of electrical energy, a second circuit component connected to the source of electrical energy, and means responsive to movement of the conveyor to a predetermined position along

2 the trackway to connect the circuit components to each other, thereby to complete an individual control circuit energized from the source of energy is provided. More particularly, a source of alternating voltage having a predetermined frequency disposed along the trackway, a condenser connected to the source of voltage, a series circuit including a second condenser and an inductance connected to the source of voltage, the condenser and the series circuit when connected forming a circuit resonant to a voltage having the frequency of the source, and means responsive to movement of the conveyor to a predetermined position along the trackway for connecting the condenser and the series circuit to each other thereby to form an individual electric circuit connected to the source of alternating voltage are provided along with control means including a trigger circuit whose functioning is adapted to be initiated by an impulse derived from the resonant circuit at the predetermined position.

For a more complete understanding of the invention, reference should now be had to the accompanying drawings in which:

Fig. 3 is an enlarged diagram of another portion of Fig. 1, and a circuit diagram of the conveyor control apparatus associated therewith;

Fig. 4 is a simplified circuit diagram of the conveyor control apparatus when the conveyor is at one point in its pathway of travel;

Fig. 5 is a simplified circuit diagram similar to Fig. 4 when the conveyor is at another point in its pathway of travel; and Fig. 6 is an end elevational view of a conveyor shown schematically in Fig. 1.

Figure 1:
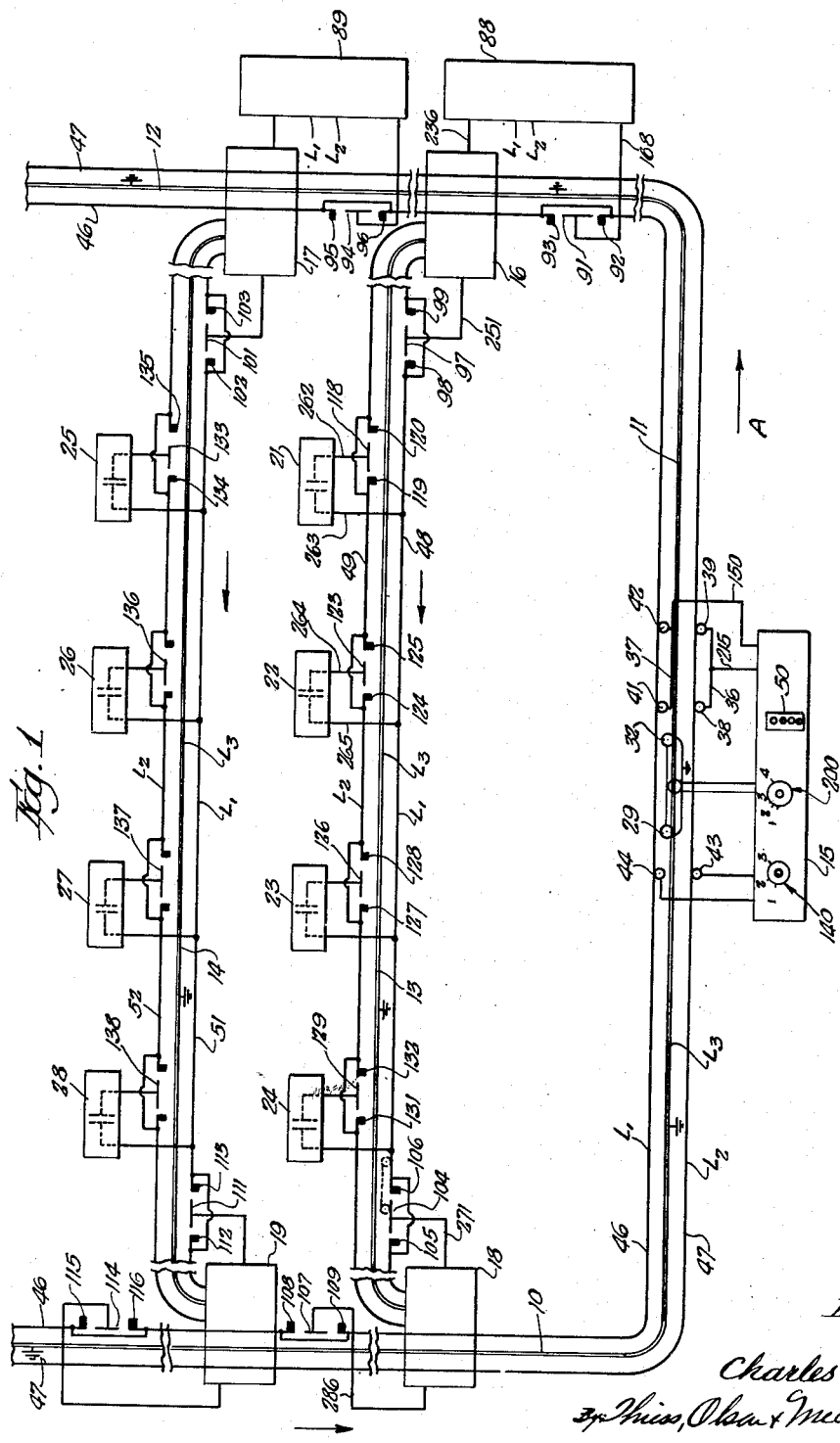
Figure 1 is a schematic diagram of a conveyor system embodying the invention.

Referring more particularly to the drawings, the invention is shown embodied in a conveyor system having trunk trackway portions 10, 11, and 12, branch trackways 13 and 14, and a conveyor 15 adapted to move thereon. The portions 10, 11 and 12 of the trunk trackway are shown as forming one end of a rectangular loop having the parallel sides 10 and 12 between which the branch trackways 13 and 14 extend. Thus it is contemplated that conveyors beginning on portion 11 of the trunk trackway will move in the direction of the arrow A onto portion 12 of the trunk trackway and along one of the branch trackways 13 or 14 in the direction of the arrows onto portion 10 of the trunk trackway and back to portion 11. While only two branch trackways 13 and 14 have been shown, it will become apparent as the description proceeds that more branch trackways may be added without departing from the spirit and scope of the invention. Associated with portion 12 of the trunk trackway and branch trackways 13 and 14 respectively, are the track switches 16 and 17, each having two positions so that in one position a conveyor moving along the trunk trackway will pass through track switches 16 and 17 to continue on portion 12 of the trunk trackway. In the other position of track switch 16, a conveyor will move therethrough and onto branch trackway 13. Similarly for track switch 17 in its other position, a conveyor moving therethrough will move from portion 12 of the trunk trackway onto the branch trackway 14. In order to bring conveyors moving on the branch trackways 13 and 14 back to portion 10 of the trunk trackway, track switches 18 and 19 are associated respectively with branch trackways 13 and 14. Each of these track switches also has two positions so that in one position of track switch 18 a conveyor moving on branch trackway 13 will pass therethrough and onto portion 10 of the trunk trackway, and in its other position a conveyor moving along portion 10 of the trunk trackway will pass therethrough and continue on portion 10 of the trunk trackway. The track switch 19 similarly has two positions. Along the branch trackway 13, there are a plurality of stop stations 21, 22, 23, and 24, and along branch trackway 14 there are also a plurality of stop stations 25, 26, 27, and 28. It is contemplated by the present invention that a conveyor moving along trunk trackway will have its control apparatus predeterminately set by an operator so that either the track switch 16 or 17 will be operated, and the conveyor will be controlled to stop at one of the stopping stations along branch trackways 13 and 14.

Adapted to move over the trunk and branch trackways is a conveyor 15 which embodies apparatus within itself for controlling its stopping and starting as well as for initiating operation of the track switches. Referring to Fig. 6 it will be seen that the conveyor 15 includes a U-shaped yoke 34 from which the conveyor proper including the conveyor propulsion motor 35 and control apparatus is supported. At the upper ends of the yoke the wheels 32 and 33 are rotatively mounted for running on the flanges of the trackway, e. g., the trunk trackway 11, which may be an I-beam as shown. While only one yoke 34 and associated trolley wheels 32 and 33 are shown, it will be understood that another series of trolley wheels which are longitudinally spaced from those shown may be used as indicated diagrammatically by the trolley wheel 29 of Fig. 1. Also associated with the conveyor are the trolleys 36 and 37 which include respectively the pair of spaced apart trolley wheels or other types of contacts 38 and 39, and 41 and 42. The trolley wheels 38 and 39 are adapted to run on bus bars, and spaced therefrom so as to run upon the same bus bar is another trolley wheel or contact 43. Similarly, the trolley wheels 41 and 42 are adapted to run on bus bars, and spaced therefrom so as to run upon the same bus bar is a trolley wheel or contact 44. The trolleys 41 and 42, and the trolleys 38 and 39 supply power to the conveyor propulsion motor 35 and also cooperate with the trolleys 43 and 44 to supply control impulses to the conveyor to stop the conveyor and to operate the track switches. The spacing between the trolley wheels 41 and 42, and 38 and 39, the spacing of trolley 43 from trolley 38, as well as the spacing of trolley 44 from trolley 41, have values which will be indicated subsequently in this specification. Mounted on the conveyor is a control box 45 which contains all of the control apparatus carried by the conveyor necessary to control the conveyor in its movements. The control box contains not only the control for the propulsion motor, but also the control mechanism for stopping the conveyor and determining which of the various branch trackways it is to move on, the four-way push button switch 50 being provided to manually control the conveyor. While one conveyor is shown, as many more as are desired may of course be used.

Figure 2:
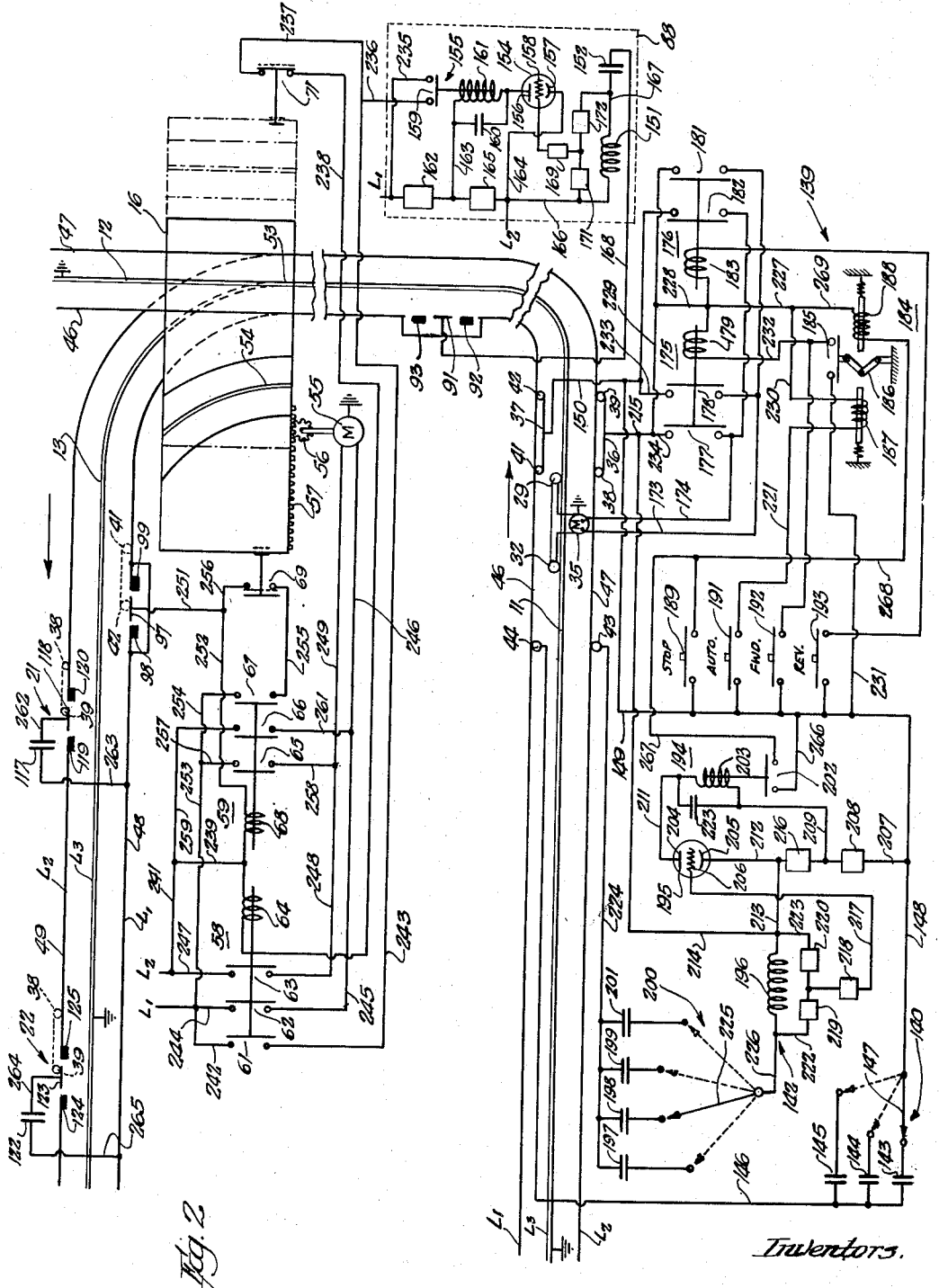
Fig. 2 is an enlarged diagram of a portion of Fig. 1, and a circuit diagram of the conveyor control apparatus associated therewith.

To supply power to the conveyor for propelling it along the trackways, bus bars 46 and 47 extend along the trunk trackway portions 10, 11, and 12, the bus bars 48 and 49 extend along the branch trackway 13, and the bus bars 51 and 52 extend along the branch trackway 14, suitable bus bar sections also being provided on the track switches 16, 17, 18, and 19 to supply power to conveyors while moving thereon. The bus bars as described form two conductors of a three-wire, three-phase power supply and the various trackways 10, 11, 12, 13 and 14 form the other conductors thereof, the three-phase system being indicated by the reference characters $L_1$, $L_2$, and $L_3$, of which $L_3$ is the trackway and is grounded at all necessary points as shown. While a three-phase supply system has been shown, and the invention will be described in connection therewith, it will be understood that a single-phase alternating current supply, or other multiphase supplies may be used. The necessary power is supplied to the conveyor motor by the trolleys 38, 39 and 41, 42 contacting the various bus bars, for example, the bus bars 47 and 46 as shown in Figs. 1 and 2.

As previously pointed out, the track switches 16 and 17 have two operative positions, one permitting a conveyor moving along trunk trackway portion 11 to continue its movement along trunk trackway portion 12 (through trackway position) and a second position in which the conveyor moves from the trunk trackway portion 12 onto one of the branch trackways 13 or 14 (curved trackway position). Referring to Fig. 2, it will be seen that the track switch 16 is provided with two trackways 53 and 54 and associated bus bars. In the position shown by the solid lines, the straight trackway 53 registers with the trunk trackway portion 12, and a conveyor moving on the trunk trackway will continue thereon. In the position shown by the broken lines, the curved trackway 54 registers with trunk trackway portion 12 and the branch trackway 13, so that a conveyor moving on trunk trackway portion 12 is deflected therefrom onto branch trackway 13. To move track switch 16 from one position to the other, a three-phase motor 55 is provided and is adapted to drive a gear 56 which engages a gear rack 57 mounted on the track switch. Power is supplied to motor 55 by means of contactors 58 and 59, the contactor 58 controlling the motor to run in a direction to move track switch 16 so that the curved trackway 54 registers with the trunk trackway portion 12 and the curved trackway 13, whereas contactor 59 controls the motor to run in the reverse direction to move the track switch to a position where the straight trackway 53 registers with trunk trackway portion 12. Contactor 58 includes three pairs of normally open contacts 61, 62 and 63, all of which are operated by a coil 64, the coil 64 being normally unenergized and must be continually energized in order to hold the contacts 61, 62 and 63 closed. The contactor 59 is substantially identical to contactor 58 and includes three pairs of normally open contacts 65, 66, and 67, all of which are adapted to be operated by a coil 68 which is normally unenergized. In order to hold contacts 65, 66, and 67 closed, the coil 68 must be continually energized and whenever either of the coils 64 and 68 are de-energized, the contacts associated respectively therewith open.

To accurately control the final position of track switch 16, the limit switches 69 and 71 are associated therewith, the contacts of limit switch 71 being normally closed and being opened by the track switch when trackway 54 registers with the branch trackway 13 and trunk trackway portion 12 to de-energize coil 64, thereby opening contacts 62 and 63 and stopping motor 55. Correspondingly, the contacts of limit switch 69 are normally open and close when track switch 16 moves toward the curved trackway position. When track switch 16 moves from the curved trackway position to the through trackway position, the contacts of limit switch 69 are opened, thereby de-energizing coil 68 to open contacts 65 and 66 and effecting stopping of motor 55 as the track switch 16 reaches this final position.

The track switch 17 is provided with a straight and a curved trackway as well as a motor for moving the track switch, and contactors for controlling power supply to the motor identical with the corresponding elements of track switch 16, and hence these elements are not illustrated in connection with track switch 17.

The track switches 18 and 19 also as previously indicated have two positions so that conveyors moving along branch trackways 13 and 14 can move therefrom onto trunk trackway portion 10, and conveyors moving on trunk trackway portion 10 can move through on track switches 19 and 18. Referring to Fig. 3, the track switch 18 is provided with a straight trackway 72 and a curved trackway 73, so that in the position shown by the solid lines or straight trackway position trackway 72 registers with trunk trackway portion 10, and in the position shown dotted or curved trackway position, the trackway 73 registers with branch trackway 13 and trunk trackway portion 10. To move track switch 18 from one position to the other, the three-phase motor 74 is provided and is adapted to drive a gear 75 which engages a rack 76 mounted on this track switch. Power is supplied to motor 74 by means of contactors 77 and 78, contactor 77 controlling the motor to run in a direction to move the track switch from the straight trackway position to the curved trackway position, i. e., curved trackway 73 registers with branch trackway 13 and trunk trackway portion 10, and contactor 78 controlling the motor to operate in the reverse direction for moving the track switch from the curved trackway position to the straight trackway position, i. e., trackway 72 registers with trunk trackway portion 10.

The contactor 77 is of a well known type having three pairs of normally open contacts 79, 80 and 81 adapted to be operated by a normally unenergized coil 82. When coil 82 is energized, the three pairs of contacts are closed and when the coil is de-energized these pairs of contacts open. Similarly to contactor 77, the contactor 78 includes the normally open contacts 83, 84, and 85 adapted to be closed by the normally unenergized coil 90. When the coil 90 is energized, pairs of contacts 83, 84 and 85 are closed, and when coil 90 is de-energized these contacts open.

To accurately position the track switch 18, limit switches 86 and 87 are associated therewith. The contacts of limit switch 86 are closed when track switch 18 is in the straight or through trackway position, and when track switch 18 moves to the curved trackway position the contacts of limit switch 86 are opened to de-energize coil 82 thereby opening contacts 80 and 81 to effect stopping of motor 74. Correspondingly, when track switch 18 is in the curved trackway position, the contacts of limit switch 87 are closed, and when track switch moves to the straight trackway or through position, the contacts of limit switch 87 are opened to de-energize coil 90, thereby opening contacts 83 and 84 to effect stopping of motor 74.

Similarly to track switch 18, track switch 19 is provided with corresponding apparatus including a motor for shifting the track switch from one position to the other as well as contactors for supplying power to the motor. Since these elements are similar to those shown for track switch 18 and are similarly controlled, they are not illustrated.

It being contemplated by the invention that the conveyor 15 embody within itself the necessary mechanism or apparatus to selectively determine which of either of track swtiches 16 and 17 will be operated to determine whether the conveyor moves straight along trunk trackway portion 12 or turns off on to either of the branch trackways 13 or 14, the control units 88 and 89 which are energized through the influence of conveyors approaching track switches 16 and 17 are associated respectively therewith. Whenever the control unit 88 is energized, power is supplied to motor 55 to move track switch 16 from the straight trackway position to the curved trackway position, i. e., trackway 54 registers with branch trackway 13 and trunk trackway portion 12 (Fig. 2). The control unit 88 is energized in cooperation with apparatus carried by the conveyor (to be described) through a control section which includes a control conductor 91 spaced between and insulated from bus bar 46 by means of insulators 92 and 93. The control conductor 91 therefore has no energization normally and is energized only when the trolley wheels contact it. This control section is placed in the vicinity of track switch 16, but a sufficient distance away from it so that when the control conductor 91 is contacted by trolley wheel 44 and it is predetermined to do so, the track switch 16 will be moved to the curved trackway position before the conveyor arrives at the track switch.

Whenever the control unit 89 is energized, the operating motor for track switch 17 has power supplied to it to move this track switch to the curved trackway position. Similarly to control unit 88, control unit 89 is energized through a control section in bus bar 46, the control section including a control conductor 94 spaced between and insulated from the bus bar 46 by insulators 95 and 96. Control conductor 94 normally has no energization applied to it and is energized only when the trolley wheels contact it. Whenever trolley wheel 44 contacts control conductor 94 and it is predetermined to do so, the control unit 89 will be energized to effect operation of the track switch 17.

The track switch 16 has a normal position which is that when straight trackway 53 registers with trunk trackway portion 12. Accordingly, the control section including control conductor 97 spaced between and insulated from bus bar 48 by insulators 98 and 99 is associated with branch trackway 13 beyond track switch 16, so that when trolley wheel 42 contacts control conductor 97, contactor 59 will be energized to supply power to motor 55 for moving the track switch from the curved to the straight trackway position. Similarly, a control section including a control conductor 101 spaced between and insulated from the bus bar 51 by insulators 102 and 103 is associated with branch trackway 14 beyond track switch 17 so that when control conductor 101 is contacted by trolley wheel 42, the motor associated with track switch 17 is energized to move this track switch from the curved to the straight trackway position.

After a conveyor has moved along branch trackway 13 and is approaching trunk trackway portion 10, and track switch 18 is in the straight trackway position, it is necessary of course that track switch 18 be moved to the curved trackway position. To accomplish this, the control section including a control conductor 104, spaced between and insulated from the bus bar 48 by insulators 105 and 106, is associated with branch trackway 13. Whenever the control conductor 104 is contacted by trolley wheel 42, coil 82 of contactor 77 is energized thereby to effect power flow to motor 74 for shifting track switch 18 to the curved trackway position. This control section is placed before track switch 18 and a sufficient distance away from it so that a conveyor moving at its normal rate and contacting the control conductor 104, will allow sufficient time to bring about complete movement of track switch 18. With track switch 18 in the curved trackway position, and a conveyor approaches on trunk trackway portion 10, it is necessary that track switch 18 move from the curved trackway to the through trackway position. For this purpose the control section including the control conductor 107 is spaced between and insulated from the bus bar 46 by insulators 108 and 109. Whenever trolley wheel 42 contacts the control conductor 107, coil 90 of conductor 78 is energized to effect the supply of power to motor 74 for moving track switch 18 from the curved to the straight trackway position. This control section is spaced ahead of track switch 18 a sufficient distance so that a conveyor moving on trunk trackway portion 10, and having its trolley wheel 42 contact control conductor 107, will allow sufficient time for the track switch to be completely moved to the proper position before the conveyor enters the track switch. Similarly to track switch 18, the track switch 19 is provided with a control conductor 111 spaced between and insulated from bus bar 51 by insulators 112 and 113, and a control section including a control conductor 114 spaced between and separated from the bus bar 46 by insulators 115 and 116, the control conductors 111 and 114 being contacted by trolley wheel 42 to bring about operation of track switch 19 to its curved and straight trackway positions.

The invention also embodies the principle that once a conveyor is moving along one of branch trackways 13 or 14, it may be predetermined to stop the conveyor at any one of the stop stations 21, 22, 23 or 24 on branch trackway 13, or stops 25, 26, 27 and 28 on branch trackway 14. The conveyor is driven by the electric motor 35, which motor is supplied with power from the associated bus bars, and in order to stop the conveyor the power supply to the motor is interrupted by a suitable switch carried by the conveyor, the switch being operated by a control circuit which is completed at the stop station and includes apparatus stationed at the stop stations and apparatus carried by the conveyor. Referring more particularly to Fig. 2, it is seen that the stop station 21 comprises a condenser 117, one terminal of which is connected to a control conductor 118 spaced between and insulated from the bus bar 49 by means of insulators 119 and 120, and the other terminal of which is connected to bus bar 48. Since control conductor 118 is insulated from the bus bar 49, condenser 117 normally has no energization applied to it. The condenser 117, when conductor 118 is contacted by the trolley wheel 43, completes a circuit with cooperating elements carried by the conveyor to form a control circuit to stop the conveyor. Similarly, stop station 22 comprises a condenser 122, one terminal of which is connected to a control conductor 123 spaced between and insulated from bus bar 49 by insulators 124 and 125, and the other terminal of which is connected to the bus bar 48. Here also, since control conductor 123 is insulated from bus bar 49, the condenser 129 is normally unenergized, and when the control conductor is contacted by trolley wheel 43, condenser 122 cooperates with elements carried by the conveyor to form a control circuit to stop the conveyor at this stop station. The capacities of condensers 117 and 122 differ from each other whereby the cooperating elements carried by the conveyor may be predeterminately set so that a responsive control circuit will be completed when trolley wheel 43 contacts one of control conductors 118 and 123 and not the other to stop the conveyor. Similarly, stop stations 23 and 24 in branch trackway 13 are provided with condensers having different values of capacitance so as to form control or discriminating circuits with apparatus carried by the conveyor. The stop station 23 is connected to bus bar 48 and to a control conductor 126 spaced between and insulated from bus bar 49 by means of insulators 127 and 128. Stop station 24 is connected to bus bar 48 and to a control conductor 129 which is spaced between and insulated from bus bar 49 by means of insulators 131 and 132.

The condensers associated with stop stations 23 and 24 have capacity values differing from each other and from the condensers of stop stations 21 and 22 whereby discriminating control circuits may be formed with cooperating apparatus on the conveyor.

The stop stations 25, 26, 27, and 28 are each provided with condensers having the same value of capacity respectively as the stop stations 21, 22, 23, and 24, so that once the branch trackway 14 has been chosen rather than branch trackway 13, the same control apparatus carried by the conveyor may be used to stop the conveyor at stop stations 25, 26, 27, and 28 as is used for stopping the conveyor at stop stations 21, 22, 23, and 24. The stop station 25 is connected to a control conductor 133 spaced between and insulated from bus bar 52 by means of insulators 134 and 135, the stop station 25 also being connected to the bus bar 51, as shown. Similarly to stop station 25, the stop stations 26, 27, and 28 are connected respectively to control conductors 136, 137, and 138, each of these control conductors being spaced between and insulated from the bus bar 52 as shown. Whenever the control conductors 133, 136, 137, and 138 are connected by the trolley wheel 43, and the control apparatus carried by the conveyor is set so as to cooperate with one of these control conductors, a control circuit will be formed to stop the conveyor.

The control box 45 carried by the conveyor 15 includes a propulsion motor controller 139, a track switch selector 140 having positions 1, 2 and 3 (Fig. 1), and a receiver 142. The motor controller 139 is operated to stop and start conveyor propulsion motor 35, the selector 140 cooperates with apparatus associated with control units 88 and 89 to form responsive circuits for operating track switches 16 and 17, and the receiver 142 cooperates with the condensers mounted at the various stop stations in order to form responsive circuits to control the stopping of the conveyor at desired points.

In Fig. 2 the circuit elements of the control unit 88 associated with the track switch 16 are shown along with the selector unit 140 mounted on the conveyor in order to more completely describe the operation of track switch 16. The selector 140 comprises a moving contact arm 147 for contacting the condensers 143, 144, and 145 (positions 1, 2 and 3 respectively) having different values of capacitance whereby each of these condensers cooperates with corresponding elements associated with control units 88, 89, etc., whereby the track switches 16, 17, etc., may be selectively operated. Each of the condensers 143, 144, and 145 have one of their terminals connected to the conductor 146, which is connected to the trolley wheel 44 contacting bus bar 46. The other terminals of condensers 143, 144, and 145 are adapted to be contacted by the moving contact arm 147, which is connected to current collecting trolley 37 through conductors 148, 149, and 150. Since trolley wheel 44 and trolley wheels 41 and 42 (trolley 37) are running on the same bus bar 46, it is apparent that condensers 143, 144, and 145 normally have no voltage applied to them.

The control unit 88 comprises an inductance 151 and a condenser 152 connected in a series circuit and adapted to be connected in series with one of the condensers 143, 144, and 145 (Fig. 5). The condenser 143 of the selector 140 has a value such that the series circuit of condenser 152, inductance 151, and condenser 143 resonates to the bus bar frequency, 60 cycles, for example. For resonance $$f = \frac{1}{2\pi\sqrt{LC}}$$

where $f$ is the frequency of the circuit voltage in cycles per second, $\pi$ is equal to 3.1416, L is the inductance of the circuit in henries and C is the capacity of the circuit in farads. Since the circuit frequency is a constant, for example, sixty cycles, and the inductance 151 is fixed in value it follows that the capacity C must always have the same value for resonance. Thus the combination of condensers 143 and 152 in series must satisfy the above relationship. Two condensers $C_1$ and $C_2$ connected in series have a total capacity given by the law $$C = \frac{C_1 + C_2}{C_1 \times C_2}$$

The capacity of condensers 143 and 152 being $C_{143}$ and $C_{152}$, the capacity for resonance at control unit 88 is $$C = \frac{C_{143} + C_{152}}{C_{143} \times C_{152}}$$

If however either of the capacities 144 and 145 were substituted for capacity 143, the total capacity would be different and there would be no resonance at control unit 88.

The control unit 88 also includes a glow discharge tube 154 whose discharge is controlled by a voltage derived from the inductance 151 when the circuit including the inductance 151, condenser 152, and the condenser 143 is completed, and a relay 155 operated by current supplied through tube 154 to control the energization of coil 64 of contactor 58 to thereby effect operation of track switch 16. Whenever a series circuit is resonating, a high voltage appears across the elements of that circuit, for example, the inductance 151 of the circuit comprising inductance 151 and condensers 152 and 143. However, when a series circuit is not resonating, the voltages across the elements thereof are low. Since condensers 144 and 145 have values of capacity differing from that for condenser 143, from the above law, there will be no resonance when these condensers are connected in series circuit with condenser 152 and inductance 151, and accordingly insufficient control voltage is obtained.

Electron tube 154 is of a cold cathode glow discharge type having a plate 156, a cathode 157, and a control electrode or grid 158. Accordingly, when a voltage is applied between the cathode 157 and the plate 156, and a voltage of proper value is applied to grid 158, the tube will conduct current to operate relay 155. Since tube 154 is of the glow discharge type, once current begins to flow therein it continues to flow until the plate voltage is removed or reduced to a low value, as is well understood. This occurs every negative half cycle of the bus bar frequency.

The relay 155 supplied with current through tube 154 is of a well known type including a pair of contacts 159 and a coil 161 for operating the contacts. The contacts 159 are normally open and are held closed only so long as coil 161 is carrying current. Whenever there is no current in coil 161, contacts 159 remain open. Coil 161 is connected in the plate circuit of tube 154 so that the total current conducted by tube 154 will flow therethrough. Plate voltage is constantly supplied to tube 154 through a circuit extending from $L_1$ through resistor 162, conductor 163, coil 161, plate 156, cathode 157, and conductor 164 to $L_2$. Connected to resistor 162 and conductor 163 is a resistor 165 which is connected at its other end to $L_2$ and conductor 164. Resistors 162 and 165 accordingly form a potentiometer whereby any desired proportion of the voltage existing across $L_1$ and $L_2$ may be applied between the cathode and plate of tube 154. Since the voltage existing across $L_1$ and $L_2$, and hence existing across the cathode and plate of tube 154, is an alternating voltage, it follows that tube 154 conducts only impulses of current whenever grid 158 is sufficiently energized. In order to smooth out these current fluctuations in coil 161, the condenser 160 is connected across the coil terminals.

The inductance 151 and condenser 152 are connected in series circuit with each other and to control conductor 91 and $L_2$ through the following circuit: From $L_2$ through conductor 166, inductance 151, conductor 167, condenser 152, and conductor 168 to control conductor 91. Control conductor 91 being normally insulated from bus bar 46, there will be no voltage applied to the inductance 151 and condenser 142. However, when the collector 44 contacts control conductor 91, a voltage is applied to these elements as will be explained subsequently. In order to supply a control voltage to grid 158, the grid 158 is connected through a resistor 169 to the mid-point of a pair of resistors 171 and 172, the other terminals of these resistors being connected respectively across inductance 151 to conductors 166 and 167. The resistors 171 and 172 form a potentiometer whereby any desired proportion of the voltage appearing across inductance 151 may be applied to grid 158. Hence, when inductance 151 forms part of a resonating circuit, a high voltage appears thereacross, and is therefore applied to grid 158 to fire or initiate conduction through tube 154, but when inductance 151 is not part of a resonating circuit voltages appearing across it are too low to fire the tube 154. Accordingly, when conveyor 15 moves by control conductor 91 and the movable terminal 147 is connected to condenser 143 (position 1 of selector 140), the inductance 151 is part of a resonating circuit and the tube 154 fires and conducts current through coil 161 through the plate circuit described to actuate relay 155, thereby controlling operation of track switch 16. But when movable terminal 147 is connected to condensers 144 or 145 (positions 2 or 3 of selector 140), the inductance 151 is not part of a resonating circuit and no control voltage is supplied to tube 154.

The conveyor propulsion motor 35 has power supplied to it through conductors 173 and 174 and conductors from current collectors 36 and 37 including the trolleys 38, 39, and 41, 42 (Fig. 2). In order that the power flow to the motor 35 from the trolleys 36 and 37 is not interrupted when the trolleys pass over the various control sections (which include control conductors and insulators separating them from the bus bars) the spacing of the trolley wheels 41 and 42, and 38 and 39, is such that the trolleys span over the control sections and thus one of the trolley wheels of each collector is in contact with the bus bars at all times. The motor 35 is a three-phase motor (single phase or other multi-phase motors may of course be adapted to be used), but one terminal is grounded and therefore is in contact with $L_3$ at all times. Accordingly, only the two conductors 173 and 174 are necessary to supply power to the motor for both forward and reverse operation. Since it is a three-phase motor, it is necessary only to reverse the power connections from $L_1$ and $L_2$ to conductors 173 and 174 to reverse the direction of operation. To control the flow of power to motor 35 contactors 175 and 176 are provided, the contactor 175 controlling the motor to run in the forward direction, and the contactor 176 controlling the motor to operate in the reverse direction. The contactor 175 is of a well known type including the normally open pairs of contacts 177 and 178 adapted to be operated by a normally unenergized coil 179. Contacts 177 and 178 are held closed only so long as coil 179 is energized. Similar to contactor 175, contactor 176 includes normally open pairs of contacts 181 and 182 adapted to be closed by a normally unenergized coil 183, the contacts 181 and 182 being closed only so long as coil 183 is energized.

In order that the conveyor be capable of moving in the forward direction without supervision, the contacts 177 and 178 of contactor 175 may be held closed through the continuous energization of coil 179 by the latching relay 184 which includes a pair of contacts 185 adapted to be closed by an over-center toggle mechanism 186. To operate the toggle mechanism, the coils 187 and 188 are provided, coil 187 operating an armature to straighten the toggle mechanism 186 for closing contacts 185, and coil 188 operating an armature to trip the toggle mechanism for opening contacts 185. The opening coil 188 may be energized through the stop push button 189 (push button switch 50 comprises push buttons 189, 191, 192 and 193), or it may be energized by means of receiver 142 when the conveyor approaches the desired stopping station, as will be explained. To actuate the conveyor to move forwardly without the supervision of an operator, the contacts of the automatic push button 191 are closed to energize coil 187 and to control the conveyor to move forwardly or rearwardly in small amounts, i. e., inching, the contacts of the forward push button 192 or the contacts of the reverse push button 193 are closed which close circuits to coils 179 and 183 respectively.

The receiver 142 for energizing coil 187 when it is desired to stop the conveyor automatically comprises a relay 194, an electron tube 195 for supplying current to relay 194, and a series circuit consisting of an inductance 196 and one of the condensers 197, 198, 199 and 201, the series circuit forming means cooperating with the condensers at the various stop stations to provide a resonating circuit for controlling triggering or firing of electron tube 195. The condensers 197, 198, 199 and 201 along with the movable contact arm adapted to engage one terminal thereof comprise a stop station selector 200 having positions 1, 2, 3 and 4 (Figs. 1 and 2) corresponding to the condensers respectively. Relay 194 is of a well known type having a pair of normally open contacts 202, and a coil 203 for operating the contacts, the contacts 202 remaining closed only so long as coil 203 is energized. The coil 203 is in the plate circuit of electron tube 195 whereby this tube controls operation of the relay.

Electron tube 195 similar to tube 154 is of the cold cathode glow discharge type having a plate 204, a cathode 205, and a control electrode or grid 206. Plate voltage is supplied to the tube through the circuit extending from $L_1$, bus bar 46, trolley wheels 41 and 42, conductor 150, conductor 149, conductor 207, resistor 208, conductor 209, coil 203 of relay 194, conductor 211, plate 204, cathode 205, conductor 212, conductor 213, conductor 214, and conductor 215 to trolley wheels 38 and 39 through the bus bar 47 (Fig. 2) to $L_2$. Connected from resistor 208 and conductor 209 to the junctures of conductors 212 and 213, is the resistor 216. Resistors 208 and 216 in series are connected directly across the source of supply $L_1$ and $L_2$ as will be seen from the circuits described, and accordingly form a potentiometer so that any desired amount of the supply voltage may be applied to the cathode plate circuit of tube 195. Control grid 206 is connected through a conductor 217 and through a resistance 218 to the junction of the two resistances 219 and 220, as shown. The resistance 219 is connected by means of a conductor 222 to one side of inductance 196, and resistor 220 is connected by means of a conductor 223 to the other side of inductance 196. Resistors 219 and 220 in series are connected across inductance 196 and constitute a potentiometer whereby any desired portion of the voltage appearing across the inductance may be applied to control grid 206.

The responsive circuit for supplying a voltage to grid 206 consists of inductance 196, one of the condensers 197, 198, 199, and 201, and condenser at one of the stop stations (Fig. 4). When the proper combination of inductance and capacitance is made, the series circuit to which the frequency of the source is supplied resonates. As pointed out previously the law defining electrical resonance is $$f = \frac{1}{2\pi\sqrt{LC}}$$

where L is the value of inductance 196 and C is the value of capacity combinations which satisfy this law. When the circuit resonates a high voltage appears across the inductance 196 and accordingly the tube 195 fires and permits current to flow through coil 203 through the plate circuit described, thereby energizing coil 188 to stop the conveyor. Whenever the combination of total capacitance and inductance 196 is such that the series circuit formed is not in resonance, the voltage derived from inductance 196 is not sufficient to fire the tube 195. The tube 195 conducts only short impulses of current since the voltage applied to its plate is alternating, and therefore the tube becomes non-conductive during a portion of every cycle. Since coil 203 therefore receives only short impulses of current, condenser 223 is connected across it to smooth out the voltage fluctuations.

Condensers 197, 198, 199, and 201 each have one of their terminals connected to conductor 224 which is in turn connected to trolley wheel 43, and hence is connected to L₂ of the source of supply. The other terminals of the condensers are connected by means of a moving contact 225 through a conductor 226 to inductance 196 and therethrough to conductor 214, and thence through conductor 215 to the trolley collectors 38 and 39 and the source of supply L₂. Therefore when a conveyor is not at a stop station, the voltage applied to the circuit consisting of the inductance 196 and one of the associated condensers is zero since collectors 43, and 38 and 39 are running on the same bus bar. The values of capacitance of condensers 197, 198, 199 and 201 are each different from each other so that circuits completed with the condensers at the various stop stations will form responsive or resonant circuits only at the desired stop stations. Thus condenser 197 (position 1 of selector 200) cooperates with the condensers at stop stations 21 and 25, condenser 198 (position 2 of selector 200) cooperates with condensers at stop stations 22 and 26, condenser 199 (position 3 of selector 200) cooperates with condensers at stop stations 23 and 27, and condenser 201 (position 4 of selector 200) cooperates with condensers at stop stations 24 and 28. The total capacity of two condensers in series follows the law previously given. Thus to have resonance at stop station 21, condenser 117, and condenser 197, having capacity values $C_{117}$ and $C_{197}$, have a total capacity $$C = \frac{C_{117} + C_{197}}{C_{117} \times C_{197}}$$

which satisfies the law $$f = \frac{1}{2\pi\sqrt{LC}}$$

where L is inductance 196. Similarly for the remaining stop stations. Since L is the inductance 196 and is fixed in value and $f$ is sixty cycles, for example, the value C must always be the same to have resonance. Hence, since the condensers 197, 198, 199 and 201 have different values it follows that there will not be resonance unless the cooperating condensers as indicated have proper values.

With the foregoing description of structure in mind, the remainder of the structure and the operation of the system may best be set forth by considering the different aspects of the system as predeterminedly controlled conveyors move through it.

The first type of operation is that of a conveyor moving along trunk trackway portion 11 and having its final position predetermined so that it will stop at stop station 22 (Fig. 2). This requires that the track switch 16 be moved to its curved track position, i. e., trackway 54 registers with branch trackway 13, and further that the conveyor move past stop station 21 without stopping. The track switch selector 140 is set to position 1, contact arm 147 contacts the terminal of condenser 143, and the stop station selector 200 is set to position 2, contact arm 225 contacts the terminal of condenser 198.

To start the conveyor moving, the operator pushes the automatic button 191 (Fig. 2) closing the circuit extending from L₁, bus bar 46, trolley wheels 41 and 42, conductor 150, conductor 149, closed contacts of automatic switch 191, conductor 221, coil 187, conductor 230, conductor 227, conductor 228, conductor 229, conductor 215, trolley wheels 38 and 39, and bus bar 47 to L₂. This circuit energizes coil 187 to straighten out the overcenter toggle 186 to close contacts 185. Closing contacts 185 energizes the coil 179 through a circuit extending from bus bar 46, trolley wheels 41 and 42, conductors 150 and 149, conductor 231, closed contacts 185, conductor 232, coil 179, conductors 228, 229, and 215, and trolley wheels 38 and 39 to bus bar 47. Energizing coil 179 picks up the relay 175 and closes contacts 177 and 178, and since relay 184 is mechanically latched, contacts 177 and 178 remain closed. Closing contacts 177 and 178 supplies power to motor 35 through a circuit extending from bus bar 46 through trolley wheels 41 and 42, conductor 150, conductor 233, closed contacts 178, conductor 173 to motor 35, and from bus bar 47 through current collectors 38 and 39, conductor 215, conductor 234, closed contacts 177, and conductor 174 to the motor. The motor is thereby energized by connecting conductors 173 and 150, and conductors 174 and 215 to run in the forward direction.

As the conveyor moves forward onto the trunk trackway portion 12, the trolley wheel 42 contacts the control conductor 91 completing a circuit from bus bar 46 through trolley wheels 41 and 42, control conductor 91, conductor 168, condenser 152, inductance 151, and conductor 166 to L₂. The 60 cycle voltage of the system is therefore applied across the condenser 152 and inductance 151 in a series circuit. However, the combination of inductance 151 and condenser 152 does not resonate to the frequency of the system, and accordingly no control impulse is applied to tube 154. When trolley wheel 41 contacts control conductor 91, condenser 152 and inductance 151 also receive a voltage impulse as described for trolley wheel 42, but this also produces no voltage impulse applied to tube 154. As the conveyor continues to move along trunk trackway portion 12, the trolley 44 contacts control conductor 91 (the trolley 44 being spaced from trolley 41 a distance sufficient so that trolley 41 is past control conductor 91 before trolley 44 contacts it). This situation is illustrated in a more simplified form in Fig. 5. Referring to Fig. 5 as well as to Fig. 2, a circuit is completed extending from $L_1$ or bus bar 46 through current collecting trolleys 41 and 42, conductors 150, 149, and 148, contact arm 147, condenser 143, conductor 146, trolley 44, control conductor 91, conductor 168, condenser 152, inductance 151, and conductor 166 to $L_2$. It is seen that the condenser 143, the condenser 152, and the inductance 151 are in a series circuit. Moreover, the value of the total capacitance of condensers 143 and 152 is such that with inductance 151 a circuit resonating to the power supply frequency is formed. Accordingly, a high voltage appears across the inductance 151 and tube 154 fires to pass current since there is a plate voltage applied to it, as previously described. Current conducted by tube 154 passing through coil 161 of relay 155 picks up this relay and closes the contacts 159. If the contact arm 74 had been connected to either of the condensers 144 and 145, the series circuit including either of these condensers, the condenser 152, and the inductance 151 would not have been a circuit resonating to the frequency of the power supply, and hence the tube 154 would not have become conducting. As a conveyor moves along, trolley 44 remains on control conductor 91 only a very short interval, and hence tube 154 remains conducting only for a very short interval. Consequently the relay coil 161 maintains its contacts 159 closed only for a short interval. This short interval, however, produces a control impulse to effect movement of the track switch.

Closing contacts 159 energizes coil 64 of contactor 58 through the following circuit: From $L_1$ through conductor 235, closed contacts 159, conductor 236, conductor 237, closed contacts of limit switch 71, conductor 238, coil 64, conductor 239, and conductor 241 to $L_2$. Energizing coil 64 closes pairs of contacts 61, 62, and 63, the closed contacts 61 forming a holding circuit for coil 64 as follows: From $L_1$ through conductor 242, closed contacts 61, conductor 243, conductor 237, closed contacts of limit switch 71, conductor 238, coil 64, conductors 239 and 241 to $L_2$. Therefore, when relay contacts 159 are opened, the coil 74 remains energized. Closing contacts 62 and 63 supplies power to motor 55 for moving track switch 16 to the curved trackway position through circuits extending from $L_1$ through conductor 244, closed contacts 62, conductor 245, and conductor 246 to motor 55, and from $L_2$ through conductor 247, through closed contacts 63, through conductor 248 and conductor 249 to the motor 55. $L_1$ and $L_2$ thus are connected respectively to conductors 246 and 249 to run motor 55 in the desired direction, the third terminal of motor 55 being a ground connection ($L_3$). The motor 55 continues to run until the track switch 16 reaches the position where trackway 54 registers with branch trackway 13 and trunk trackway portion 12 at which position the contacts of limit switch 71 are opened, thereby de-energizing the coil 64 to effect opening of contacts 62 and 63. Consequently, the power supply to the motor 55 is interrupted and the track switch 16 becomes stationary.

The conveyor now moves through on curved trackway 54 and onto the branch trackway 13. As soon as the trolley wheel 42 contacts the control conductor 97 (the complete conveyor has moved through the track switch and is on branch trackway 13), the following circuit is completed to energize coil 68 of contactor 59 to shift track switch 16 back to the straight trackway position: From $L_1$, bus bar 48, trolleys 41 and 42, control conductor 97, conductor 251, conductor 252 through coil 68, conductors 239 and 241 to $L_2$. Energizing coil 68 closes pairs of contacts 65, 66, and 67, contacts 67 forming a holding circuit for coil 68 as follows: From $L_1$ through conductor 253, conductor 254, closed contacts 67, conductor 255, closed contacts of limit switch 69 (these contacts are closed when track switch 16 moves away from the straight trackway position), conductor 256, conductor 252 through coil 59, conductors 239 and 241 to $L_2$. Therefore, when trolley collectors 41 and 42 leave control conductor 97, relay coil 68 remains energized. Closing contacts 66 and 67 supplies power to motor 55 to run in the reverse direction through circuits extending from $L_1$ through conductor 253, conductor 257, closed contacts 65, conductor 258 and conductor 249 to motor 55, and from $L_2$ through conductor 241, conductor 259, closed contacts 66, conductor 261, and conductor 246 to motor 55. $L_1$ and $L_2$ have now been connected to conductors 249 and 246 respectively, thereby reversing the connection to motor 55 which runs in the reverse direction to move track switch 16 to the point where trackway 53 registers with trunk trackway portion 12. At this point the contacts of limit switch 69 are opened by the track switch 16 to interrupt the circuit to coil 68, thereby opening contacts 65 and 66. Consequently, the motor 55 stops.

The conveyor continues to move in the direction of the arrow along branch trackway 13, moving past stop station 21 without stopping, and approaching stop station 22. At stop station 21, however, the current collecting trolleys 38 and 39 span from bus bar 49 to control conductor 118, thereby completing a circuit from $L_2$, bus bar 49, through current collecting trolleys 38 and 39, control conductor 118, conductor 262, condenser 117, and conductor 263 to bus bar 48 ($L_1$). Accordingly, the condenser 117 is subjected to two impulses of the bus bar voltage. This is harmless and may be neglected since no control circuits are completed and the condenser 117 may easily be constructed to withstand the voltage. As the conveyor approaches stop station 22, the trolley wheels 38 and 39 contact the control conductor 123 to complete a circuit through condenser 122 extending from bus bar 49 through current collecting trolleys 38 and 39, control conductor 123, conductor 264, condenser 122, and conductor 265 to bus bar 48. Here also the condenser 122 is subjected to the voltage of the system.

As the conveyor continues to move along trackway 13, the trolley wheel 43 contacts control conductor 123 as is shown best in Fig. 4. Referring to Figs. 4 and 2, when trolley 43 contacts control conductor 123 at stop station 22, a circuit is completed extending from $L_2$, bus bar 49, trolley wheels 38 and 39 through conductors 215 and 214, inductance 196, conductor 226, contact arm 225, condenser 198, conductor 224, trolley wheel 43, control conductor 123, conductor 264, condenser 122, and conductor 265 to bus bar 48 or $L_1$. It is seen that the condenser 122, the condenser 198, and inductance 196 are in a series circuit across the source of supply $L_1$ and $L_2$. Since condenser 198 was selected with a capacity so that the combined condensers 122 and 198 with the inductance 196 form a circuit resonating to the frequency of supply, this circuit resonates and accordingly a high voltage appears across inductance 196. The desired proportion of this voltage is applied to grid 206 of tube 195 which becomes conducting, allowing current to flow through coil 203 of relay 194 which picks up and closes contacts 202.

Closing contacts 202 completes a circuit to coil 188 for tripping the over-center mechanism 186 as follows: From bus bar 48 (Figs. 2 and 4), trolley wheels 41 and 42, conductor 150, conductor 149, conductor 266, closed contacts 202, conductor 267, conductor 268 through coil 188, conductor 269, conductors 227, 228, 239, and 215 to trolley wheels 38 and 39, and bus bar 49. Energizing coil 188 trips the over-center mechanism 186, opening contacts 185, and accordingly de-energizing the coil 179 which opens contacts 177 and 178 to stop motor 35, and hence the conveyor, at stop station 22. The conveyor of its own momentum will move past control conductor 123 whereby the circuit through condensers 122 and 198 and inductance 196 is de-energized.

Referring to Fig. 4, and noting the series resonant circuit formed by condensers 122 and 198 and inductance 196, it will be readily understood that since condenser 117 (stop station 21) differs from condenser 122, that when conveyor 15 moved past stop station 21 the condenser 117 did not cooperate with condenser 122 to form a resonant circuit with inductance 196. Similarly, when the conveyor continues to move along branch trackway 13 and contact arm 225 is allowed to remain connected to condenser 198, the conveyor will not stop at stations 23 and 24 since the condenser 198 will not cooperate with the condensers at these stop stations to form a resonant circuit.

To start the conveyor moving again, the operator pushes the automatic button 191 thereby energizing coil 187 through a circuit previously described, but having its origin in this position on bus bars 48 and 49 instead of 46 and 47. Accordingly the motor 35 is energized to continue the conveyor in this movement so that it approaches the track switch 18. Assume that the track switch 18 is in the position shown solid in Fig. 3. It will be necessary that the track switch be moved so that curved trackway 73 registers with branch trackway 13, and trunk trackway portion 10. Accordingly, when trolley wheel 42 contacts the control conductor 104, a circuit is completed to energize coil 82 of contactor 77, as follows: From L₁, bus bar 48 through trolley wheels 41 and 42, control conductor 104, conductor 271, conductor 272, coil 82, conductor 273, conductor 274, and conductor 275 to L₂. Energizing coil 82 picks up relay 77 to close contacts 79, 80, and 81, the contact 79 forming a holding circuit for coil 82 as follows: From L₁ through closed contacts of limit switch 86, conductor 276, closed contacts 79, conductor 277, conductor 272, coil 82, and conductors 273, 274, and 275 to L₂. Thus, when the trolley wheel 42 moves off of control conductor 104, relay coil 82 remains energized.

Closing contacts 80 and 81 supplies power to motor 74 as follows: From L₁ through conductor 278, conductor 279, closed contacts 80, conductor 281, and conductor 282 to motor 74, and from L₂ through conductors 275 and 274, conductor 283, closed contacts 81, conductor 284, and conductor 285 to motor 74. The motor 74 is a three-phase motor, one terminal of which is grounded as shown. Power is thus supplied to the motor to move track switch 18 to the curved trackway position, and when this position is reached the contacts of limit switch 86 are opened to deenergize coil 82, thereby opening contacts 80 and 81 to deenergize motor 74 and to stop track switch 18. The conveyor then moves through the track switch 18 onto trunk trackway portions 10 and 11 in the direction of the arrows. The first phase of the operation is now completed.

The second phase of operation occurs when a conveyor is predeterminately controlled to move onto branch trackway 14 and to stop at any of the stop stations therealong, for example, stop station 27. To effectuate this condition, assuming that the conveyor begins its movement on trunk trackway portion 11, contact arm 147 is connected to condenser 144 (position 2 of track switch selector 140, Fig. 1), and contact arm 225 is set to be connected to condenser 199 (position 3 of stop selector 200, Fig. 1). To start the conveyor moving the operator closes automatic push button 191 as previously described. When the conveyor approaches control conductor 91 associated with track switch 16, the control unit 88 is not energized since the condenser 144 when connected in series circuit with condenser 152 and inductance 151 (Fig. 5), the circuit does not resonate to the power supply frequency and hence no control impulse is applied to tube 154. Accordingly, the conveyor moves past track switch 16 and approaches track switch 17. Since control unit 89 is identical with control unit 88, with the exception of the fact that the condenser 152 for control unit 88 is different than the corresponding condenser for control unit 89, the value of this latter condenser being such that when combined with condenser 144, and the inductance at control unit 89, control unit 89 is energized to move track switch 17 to the curved trackway position to allow the conveyor to move through onto branch trackway 14. Similarly to branch trackway 13, when the trolley wheels 41 and 42 contact the control conductor 101 in branch trackway 14, circuits are energized to move track switch 17 back to the straight or through trackway position. It is believed that the operation of track switch 17 as thus briefly described will be clear by reference to the circuits and apparatus described in connection with track switch 16.

As the conveyor moves along on branch trackway 14, the condensers at the stop stations 25 and 26 are of course contacted by the trolley wheel 43 to complete circuits with condenser 199 and inductance 196 carried by the conveyor. However, these condensers do not have the proper values of capacitance to cooperate with condenser 199 and inductance 196 to provide a circuit resonating to the power supply frequency. When the conveyor reaches stop station 27 and the trolley wheel 43 contacts the control conductor 137, a circuit similar to that shown in Fig. 4, but comprising the condenser at stop station 27, condenser 199, and inductance 196 is completed. This circuit resonates to the power supply frequency and hence a voltage impulse is applied to control grid 206 of tube 195 to effect stopping of the conveyor propulsion motor 35, as already described. By closing the automatic push button 191, the conveyor may again be started, and it will move past stop station 28 without stopping since the condenser at this station does not combine with condenser 199 to effect a resonating circuit.

When the conveyor approaches track switch 19, as described for the first aspect of conveyor operation, the track switch 19 is controlled to move to the curved trackway position when trolley wheel 42 contacts control conductor 111. The conveyor then moves through track switch 19 onto trunk trackway portion 10, and moves therealong until trolley wheel 42 contacts control conductor 107 associated with track switch 18. The track switch 18 is in the curved trackway position as described in connection with the first aspect of operation, and accordingly the track switch must be moved to the through trackway position. When trolley wheel 42 contacts the control conductor 107, a circuit is completed to energize coil 90 of contactor 78 through a circuit as follows (Fig. 3): From $L_1$, bus bar 46, trolley wheels 41 and 42, control conductor 107, conductor 286, coil 90, conductors 273, 274 and 275 to $L_2$. Energizing coil 90 picks up contactor 78 to close contacts 83, 84 and 85, the contacts 85 forming a holding circuit for coil 90, as follows: From $L_1$ through closed contacts of limit switch 87 (these contacts are closed when track switch 18 moves away from the straight trackway position), through conductor 287, closed contacts 85, conductor 288, conductor 289, coil 90, through conductors 273, 274, and 275 to $L_2$. Therefore, coil 85 remains energized when trolley wheels 41 and 42 move away from control 107.

Closing contacts 83 and 84 supplies power to motor 74 through circuits as follows to run in the reverse direction to move track switch 18 to the straight or through trackway position: From $L_1$ through conductor 278, closed contacts 84, conductor 291, conductor 285 to motor 74, and from $L_2$ through conductor 275, conductor 292, closed contacts 83, conductor 293, and conductor 282 to motor 74. $L_1$ and $L_2$ are thus connected to conductors 285 and 282 to operate motor 74 in the reverse direction. When the track switch reaches the straight trackway position, contacts of limit switch 87 are opened to de-energize coil 90, effecting opening of contacts 83, 84 and 85 to de-energize the motor 74 and thereby stopping the track switch. The conveyor continues its movement through track switch 18 and onto the trunk trackway portion 11. The second phase of operation is now completed.

In the third phase of operation, it is predetermined that the conveyor will move past both track switch 16 and 17 to a track switch at some other point in the conveyor system, and is also predetermined to stop at some other point on a branch trackway associated with that track switch. Accordingly, the moving contact 147 is connected to condenser 145 (position 3 of the track switch selector 140, Fig. 1) and the moving contact 225 is connected to condenser 201 (position 4 of the stop selector 200, Fig. 1). Thus when the conveyor approaches track switches 16 and 17, there are no resonating circuits completed with the inductances and condensers arranged at control units 88 and 89, and the conveyor moves on to some other track switch which will be operated. As the conveyor moves on to the third branch trackway, it will move along the various stop stations until the condenser arranged at a particular stop station cooperates with condenser 201 and inductance 196 to form a resonant circuit, thereby effecting stopping of the conveyor. Continuing to move along this branch trackway, the conveyor moves onto trunk trackway portion 10, and eventually the trolley wheel 42 contacts control conductor 114 to cause track switch 19 to move to the through trackway position and permit the conveyor to move through, and similarly move through the track switch 18 by virtue of trolley wheel 42 contacting control conductor 107. The conveyor then moves on to trunk trackway portion 11. The third phase of operation is complete.

The three examples of operation illustrate the modes of operation of conveyors in the system. While the operation has been described in connection with only one conveyor 15, it will be understood without additional illustration that numerous conveyors similar to conveyor 15 may move on the various trackways, each of such conveyors having selectors corresponding to selectors 140 and 200 whereby the conveyor movements are predeterminedly controllable. In each case the apparatus carried by the conveyors is connected into electrical circuits when the trolleys contact the control conductors 91 or 94 for track switch operation and contact the control conductors 21—24 or 25—28 for controlling conveyor stopping, the control conductors forming part of the bus bar system. The control conductors 91 and 94 are connected through circuits including inductances and capacities of different values to one side of a source of power supply. Since the inductances and capacities form different values of impedance, the control conductors 91 and 94 are electrically differentiated from each other and consequently are discriminating in their cooperation with apparatus carried by the conveyor. Thus the control conductors discriminate between different conveyors as to which one will set off movement of a track switch. Similarly at each of the stop stations in branch trackway 13, for example, the condensers are connected to control conductors 118, 123, 126 and 129 respectively, the condensers also being connected to one side of the source of supply. The capacitance values of the condensers being different, they form different impedance values and thus these control conductors are also electrically differentiated from each other and hence are discriminating in their cooperation with conveyor carried apparatus. Accordingly the control conductors discriminate between different conveyors as to which one will stop at which stop station. Each control conductor constitutes in effect an electrically different source of supply waiting for the proper cooperating apparatus to be connected to it. Correspondingly the trolleys 43 and 44 of the different conveyors have different values capacitance, and capacitance and inductance connected to them respectively. These elements having different values of impedance, the trolleys are also electrically differentiated from each other.

While a particular embodiment of the invention has been shown it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. Conveyor apparatus comprising a trackway including a trunk trackway and a plurality of branch trackways, a plurality of motor operated track switches for connecting said branch trackways to said trunk trackway, bus bar means disposed along said trackways including energized sections interrupted by a gap adjacent each track switch, bus bar portions differentiated electrically reactively from each other connected to a source of power and disposed in the gaps between said energized sections, means associated with each track switch for controlling movement thereof into connection with said trunk trackway, one each of said track switch movement controlling means being associated with the one of said differentiated bus bar portions adjacent said each track switch, conveyors adapted to move on said trackways, and individual current collecting means also differentiated electrically reactively from each other carried by each of said conveyors for cooperation with said differentiated bus bar portions when connected thereto for selectively determining which of said track switch movement control means is energized, said current collecting means being adapted to contact said energized bus bar sections whereby said differentiated bus bar portions and said differentiated collector means are sequentially connected to each other during conveyor movement.

2. Conveyor apparatus comprising a trackway including a trunk trackway and a plurality of branch trackways, a plurality of motor operated track switches for connecting said branch trackways to said trunk trackways, bus bar means disposed along said trackway including energized sections interrupted by a gap adjacent each track switch, bus bar portions differentiated electrically reactively from each other connected to a source of power and disposed in the gaps between said energized sections, means including an electron tube trigger circuit associated with each track switch and associated with the bus bar portion adjacent said each track switch for controlling movement thereof to connect the associated branch trackway to said trunk trackway, conveyors adapted to move on said trackways, and individual current collecting means also differentiated electrically reactively from each other carried by each of said conveyors for cooperation with said differentiated bus bar portions when connected thereto for selectively determining which of said trigger circuits has its operation initiated, said current collecting means being adapted to contact said energized bus bar sections whereby said differentiated bus bar portions and said differentiated collector means are sequentially connected to each other during conveyor movement.

3. Conveyor apparatus comprising a trackway, a plurality of stop stations arranged therealong, bus bar means disposed along said trackway including energized sections interrupted by gaps adjacent said stop stations, bus bar portions differentiated electrically reactively from each other connected to a source of power and disposed in the gaps between said energized sections, conveyors adapted to move on said trackway, stop control means carried by each of said conveyors, and individual current collecting means also differentiated electrically reactively from each other carried by each of said conveyors for cooperation with said differentiated bus bar portions when connected thereto for selectively determining which of said stop control means is energized, said current collecting means being adapted to contact said energized sections whereby said differentiated bus bar portions and said differentiated collector means are sequentially connected to each other during conveyor movement.

4. Conveyor apparatus comprising a trackway including a trunk trackway and a plurality of branch trackways, a plurality of track switches for connecting said branch trackways to said trunk trackway, bus bar means disposed along said trackway including energized sections interrupted by gaps adjacent each track switch, bus bar portions insulated from said energized sections disposed in said gaps, a plurality of inductive reactive circuits connected to a source of alternating voltage having a predetermined frequency, one of said plurality of inductive reactive circuits being associated with each track switch and being connected to the bus bar portion disposed in the gap adjacent said each track switch, a plurality of conveyors adapted to move along said trackways, contact means carried by each of said conveyors, capacitive reactive means carried by each of said conveyors connected to the contact means associated therewith and connected to said source of alternating voltage, each of said inductive reactive circuits when connected to certain ones of said capacitive reactive means forming a circuit resonant to a voltage having the frequency of said source, said contact means being adapted to contact said energized sections and said bus bar portions and during conveyor movement sequentially connecting said inductive reactive circuits and said capacitive reactive means in individual electric circuits, thereby to form resonating circuits only when individual ones of said inductive reactive circuits are connected to said certain ones of said capacitive reactive means, and control means associated with each track switch and adapted to have energization thereof effected by the associated inductive reactive circuit when forming part of a resonating circuit for effecting connection of the track switch with said trunk trackway.

5. Conveyor apparatus comprising a trackway, bus bar means disposed along said trackway including energized sections interrupted by a plurality of spaced gaps, bus bar portions insulated from said energized sections disposed in said gaps, a plurality of inductive reactive circuits, one each of which is connected to each of said bus bar portions and to a source of alternating voltage having a predetermined frequency, a plurality of conveyors adapted to move along said trackway, contact means carried by each of said conveyors, capacitive reactive means carried by each of said conveyors connected to said source of alternating voltage and to the contact means associated with said each conveyor, each of said inductive reactive circuits when connected to certain ones of said capacitive reactive means forming circuits resonant to a voltage having the frequency of said source, said contact means being adapted to contact said energized sections and said bus bar portions and during conveyor movement sequentially connecting said inductive reactive circuits and said capacitive reactive means in individual electric circuits, thereby to form a resonating circuit only when individual ones of said inductive reactive circuits are connected to said certain ones of said capacitive reactive means, and conveyor control means associated with each of said inductive reactive circuits, individual ones of said control means being adapted to have energization thereof effected by the associated inductive reactive circuit when forming part of a resonating circuit.

6. Conveyor apparatus comprising a trackway, a plurality of stop stations spaced along said trackway, bus bar means disposed along said trackway including energized sections interrupted by gaps one each of which is adjacent each stop station, bus bar portions insulated from said energized sections and disposed in said gaps, a plurality of capacitive reactive means one each of which is connected to each of said bus bar portions and connected to a source of alternating voltage having a predetermined frequency, a plurality of conveyors adapted to move along said trackway, contact means carried by each of said conveyors, inductive reactive circuits carried by each of said conveyors connected to said source of alternating voltage and to the contact means associated with said each conveyor, each one of said inductive reactive circuits when connected to certain ones of said capacitive reactive means forming a circuit resonant to a voltage having the frequency of said source, said contact means being adapted to contact said energized sections and said bus bar portions and during conveyor movement sequentially connections said inductive reactive circuits and said capacitive means in individual electric circuits, thereby to form a resonating circuit only when an individual one of said inductive reactive circuits is connected to a certain one of said capacitive reactive means, and stop control means carried by each of said conveyors and adapted to have energization thereof effected by the inductive reactive circuit carried by said each conveyor only when forming part of a resonating circuit.

7. Conveyor apparatus comprising a trackway, a plurality of stop stations disposed along said trackway, bus bar means disposed along said trackway including energized sections interrupted by gaps adjacent each of said stop stations, bus bar portions insulated from said energized sections and disposed in said gaps, a plurality of capacitive reactive means connected to a source of alternating voltage, one each of said plurality of capacitive reactive means being associated with each of said stop stations and being connected to the bus bar portion disposed in the gap adjacent said stop station, a conveyor adapted to move along said trackway, contact means carried thereby, selectable inductive reactive circuits carried by said conveyor connected to said source of alternating voltage and to the contact means carried thereby, selected ones of said selectable inductive reactive circuits when connected to certain ones of said capacitive reactive means forming circuits resonant to a voltage having the frequency of said source, said contact means being adapted to contact said energized sections and said bus bar portions and during conveyor movement sequentially connecting a selected one of said inductive reactive circuits and said capacitive reactive means in individual electric circuits, thereby to form a resonating circuit only when said selected one of said inductive reactive circuits is connected to said certain one of said capacitive reactive means, and stop control means carried by said conveyor and adapted to have energization thereof effected by the selected inductive reactive circuit when forming part of a resonating circuit.

8. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and means included in said control circuit operably responsive only to a resonant condition within said circuit to control an operation affecting the conveyor at the selected station.

9. A conveyor for travelling along a trackway, a power bus bar extending along said trackway, having a plurality of interruptions therein located at spaced distinguishable selectee stations alongside said trackway, a plurality of selectee bus bar means, one of said means being interposed at an interruption of said power bus bar at each o fsai dstations and insulated therefrom, said bus bar means being in alignment with respect to said power bus bar, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and means included in said control circuit operably responsive only to a resonant condition within said circuit to control an operation affecting the conveyor at the selected station.

10. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and means included in said control circuit operably responsive only to a resonant condition within said circuit to control an operation affecting the conveyor at the selected station, said common control power source being connected to said power bus bar and through said collector means to said conveyor borne circuit means.

11. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits, a common control power source of fixed predetermined frequency for energizing said control circuits, said conveyor borne circuit means being manually adjustable as to its reactive characteristics to complete an electric control circuit resonant to said predetermined frequency only with the circuit means of a selected station, upon engagement of the collector means with the bus bar means of the selected stations, and means included in said control circuit operably responsive only to a resonant condition within said circuit to control an operation affecting the conveyor at the selected station, said common control power source being connected to said power bus bar and through said collector means to said conveyor borne circuit means.

12. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and a translating device located on said conveyor and included in said control circuit and operably responsive only to a resonant condition within said circuit to control an operation affecting the conveyor at the selected station.

13. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and a plurality of translating devices located one each at the respective stations and sequentially included in said control circuit and operably responsive only to a resonant condition within said circuit to control an operation affecting the conveyor at the selected station.

14. A trackway, a conveyor for travelling along said trackway, a propulsion motor carried by said conveyor, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and means included in said control circuit operably responsive only to a resonant condition within said circuit to interrupt the flow of electric power to said propulsion motor at the selected station.

15. A trackway, a conveyor for travelling along said trackway, a plurality of track switches in said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stations and electrically connected to respective ones of said bus bar means, conveyor borne circuit means electrically connected to said collector means, said conveyor borne circuit means being connected to said trackside circuit means sequentially to complete electric control circuits energized by a common control power source of fixed predetermined frequency, said conveyor borne circuit means being manually adjustable as to its reactive characteristics to complete an electric control circuit resonant to said predetermined frequency only with the circuit means of a selected station, upon engagement of the collector means with the bus bar means of the selected station, and electric control means individual to said stations and sequentially included in said control circuit and operably responsive only to a resonant condition within said circuit to operate the corresponding track switch at the selected station.

16. A trackway, a conveyor for travelling along said trackway, a power bus bar extending along said trackway, having a plurality of interruptions therein located at spaced distinguishable selectee stations alongside said trackway, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent a plurality of said stations and electrically connected to respective ones of said bus bar means, a plurality of trackside partial control circuits having circuit elements of differing reactive characteristics located adjacent others of said stations and electrically connected to respective ones of said bus bar means, conveyor borne circuit means electrically connected to said collector means, said conveyor borne circuit means being manually adjustable as to its reactive characteristics to complete an electric control circuit resonant to a predetermined frequency of applied voltage only with the circuit means of a selected station, upon engagement of the collector means with the bus bar means of the selected station, a translating device carried by said conveyor and included in said control circuit and operably responsive only to a resonant condition within said circuit to control an operation affecting the conveyor at the selected station, a conveyor borne partial control circuit electrically connected to said collector means and manually adjustable as to its reactive characteristics to complete an electric control circuit resonant to a predetermined frequency of applied voltage only with the partial control circuit of a selected station, upon engagement of the collector means with the bus bar means of the selected station, and a plurality of translating devices located one each at the respective stations having said partial control circuits and sequentially included in said last-mentioned control circuit and operably responsive only to a resonant condition within said control circuit to control an operation affecting said conveyor at the selected station.

17. A trackway, a conveyor for travelling along said trackway, a plurality of track switches in said trackway, a propulsion motor carried by said conveyor, a power bus bar extending along said trackway, having a plurality of interruptions therein located at spaced distinguishable selectee stations alongside said trackway including track switch stations and stop stations, a plurality of selectee bus bar means, one of said means being interposed at an interruption of said power bus bar at each of said stations, said bus bar means being in alignment with respect to said power bus bar and insulated therefrom, control collector means carried by said conveyor and guided to engage said power bus bar substantially continuously and to engage said interposed bus bar means sequentially as the collector means travel, a plurality of distinguishable trackside circuit means having circuit elements of differing reactive characteristics located adjacent said stop stations and electrically connected to respective ones of said bus bar means, a plurality of trackside partial control circuits having circuit elements of differing reactive characteristics located adjacent said track switch stations and electrically connected to respective ones of said bus bar means, conveyor borne circuit means electrically connected to said collector means, said conveyor borne circuit means being manually adjustable as to its reactive characteristics to complete an electric control circuit resonant to a predetermined frequency of applied voltage only with the circuit means of a selected stop station, upon engagement of the collector means with the bus bar means of the selected station, means included in said control circuit and carried by said conveyor and operably responsive only to a resonant condition within said circuit to interrupt the flow of electric power to said propulsion motor at the selected stop station, a conveyor borne partial control circuit electrically connected to said collector means and manually adjustable as to its reactive characteristics to complete an electric control circuit resonant to a predetermined frequency of applied voltage only with the partial control circuit of a selected track switch station, upon engagement of the collector means with the bus bar means of the selected track switch station, and electric control means individual to said track switch stations and sequentially included in said last-mentioned control circuit and operably responsive only to a resonant condition within said control circuit to operate the corresponding track switch at the selected track switch station.

18. A trackway, a conveyor for travelling along said trackway, a power bus bar extending along said trackway, said power bus bar having a plurality of interruptions therein individual to said stations, a plurality of electrical connecting means located adjacent said stations and arranged substantially in alignment with and insulated from said power bus bar at said interruptions, a plurality of distinguishable trackside partial circuits having circuit elements of differing reactive characteristics located adjacent said stations and electrically connected to respective ones of said electrical connecting means, control collector means carried by said conveyor and guided to engage and cooperate with said power bus bar substantially continuously and to engage and cooperate with said electrical connecting means sequentially as the collector means travel, a conveyor borne partial circuit electrically connected to said collector means, said last-mentioned partial circuit being manually adjustable as to its reactive characteristics to complete a control circuit resonant to a predetermined frequency of applied voltage only with the partial circuit of a selected station, upon engagement of the collector means with the electrical connecting means of the selected station, and means included in said control circuit operably responsive only to a resonant condition within said circuit to control an operation affecting the conveyor at the selected station.

19. A conveyor for travelling along a trackway, a power bus bar extending along said trackway, a plurality of spaced distinguishable selectee stations located alongside said trackway, said power bus bar having a plurality of interruptions therein individual to said stations, a plurality of electrical connecting means located adjacent said stations and arranged substantially in alignment with and insulated from said power bus bar at said interruptions, a plurality of distinguishable trackside partial circuits having circuit elements of differing reactive characteristics located adjacent said stations and electrically connected to respective ones of said electrical connecting means, control collector means carried by said conveyor and guided to engage and cooperate with said power bus bar substantially continuously and to engage and cooperate with said electrical connecting means sequentially as the collector means travel, a conveyor borne partial circuit electrically connected to said collector means, said last-mentioned partial circuit being manually adjustable as to its reactive characteristics to complete a control circuit resonant to a predetermined frequency of applied voltage only with the partial circuit of a selected station, upon engagement of the collector means with the electrical connecting means of the selected station, and means included in said control circuit operably responsive only to a resonant condition within said circuit to control an operation affecting the conveyor at the selected station.

References Cited in the file of this patent

UNITED STATES PATENTS

| Number | Name | Date |
|---|---|---|
| 1,797,651 | Gergacsevics et al. | Mar. 24, 1931 |
| 1,797,864 | Harlandt | Mar. 24, 1931 |
| 1,817,692 | Kloss et al. | Aug. 4, 1931 |
| 1,962,546 | Woolley et al. | June 12, 1934 |
| 2,486,221 | Spafford | Oct. 25, 1949 |